W. T. NORTON.
CULTIVATOR.
APPLICATION FILED JUNE 11, 1908.
907,864.
Patented Dec. 29, 1908.
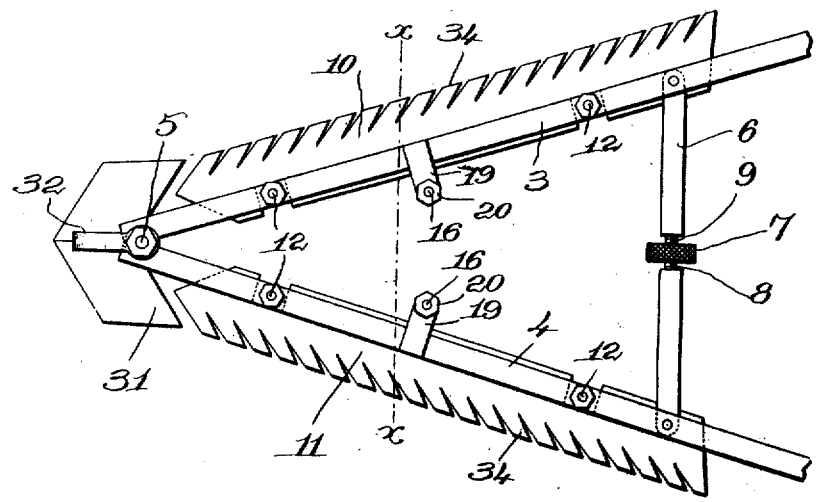
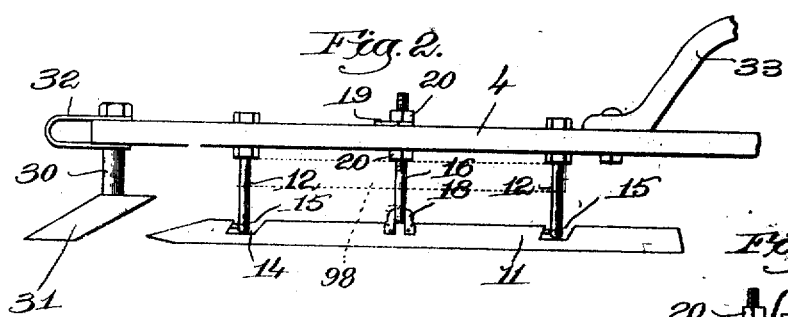
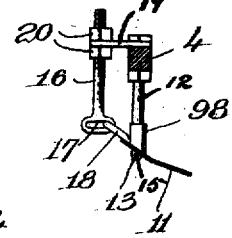
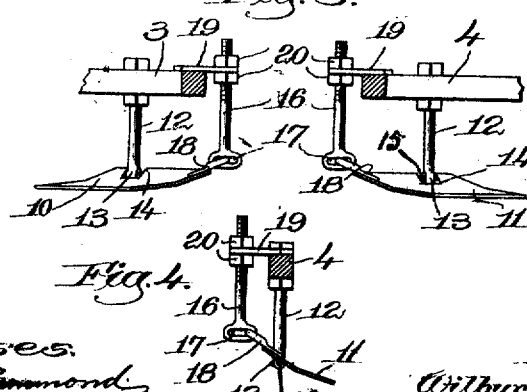
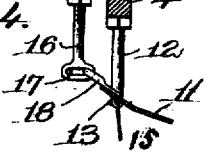
Witnesses:
Thomas J. Drummond
Joseph M. Wad
Inventor.
Wilbur T. Norton,
by Busby Bugby atty's

UNITED STATES PATENT OFFICE.

WILBUR T. NORTON, OF ALTON, ILLINOIS.

CULTIVATOR.

No. 907,864.  Specification of Letters Patent.  Patented Dec. 29, 1908.

Application filed June 11, 1908. Serial No. 437,916.

*To all whom it may concern:*

Be it known that I, WILBUR T. NORTON, a citizen of the United States, residing at Alton, county of Madison, and State of Illinois, have invented an Improvement in Cultivators, of which the following description, in connection with the accompanying drawing, is a specification, like numerals on the drawing representing like parts.

This invention relates to cultivators and has for its object to provide a novel form of cultivator which may be used either to cultivate and stir up the soil to a considerable depth or may be used simply for cutting the weeds immediately below or above the surface of the soil. These objects are accomplished by making the cultivator with two or more elongated cultivator blades which are supported so that the angular position thereof relative to the horizontal may be changed. When the cultivator blades are situated at a considerable inclination, they operate to cut into the soil and stir the latter up to a considerable depth and they also operate to force or crowd the soil laterally so that the cultivator thus arranged can be used for hilling up purposes as well as for cultivating purposes. When the cultivator blades are arranged very nearly on a horizontal plane, they do not cut into the soil to any great depth, but act merely to cut the weeds slightly below or above the surface of the soil. The device can thus be used either as a weed cutter or as a cultivator.

In the accompanying drawings wherein is shown the preferred embodiment of my invention for the purpose of illustrating the principle thereof, Figure 1 is a top plan view of a cultivator embodying the invention; Fig. 2 is a side view thereof; Fig. 3 is a section on the line y—x, Fig. 1 showing the cultivator blades adjusted for cutting weeds; Fig. 4 is a cross section through one side of the cultivator showing the blades adjusted at a different inclination; Fig. 5 is a view similar to Fig. 4 showing one side of the cultivator in section and provided with the ridgers.

The frame of the cultivator comprises the two side sills 3 and 4, which are pivoted together at their front ends as at 5 and which are connected at their rear ends by a cross brace 6 which is preferably made adjustable as to its length so that the side sills can be spread more or less.

While it is within my invention to adjust the length of the cross brace 6 in a great variety of ways, I have herein shown an adjusting screw 7 having right and left hand screw-threaded portions 8, 9 which screw into the two sections of the brace whereby by turning the adjusting screw the sections of the brace are spread apart or drawn together. This cultivator frame carries two cultivator blades 10 and 11 which preferably extend substantially the full length of the cultivator frame. These blades are pivoted to the cultivator frame so that they may be swung from an approximately horizontal position into different inclinations according to the character of the work desired to be accomplished by the cultivator. It is within my invention to pivotally support these blades on the frame in any suitable way. One convenient way of accomplishing this object is by making the frame with a plurality of depending supports 12 to which the inner edges of the cultivator blades are pivoted. The supports shown are provided at their lower ends with eyes 13 which are received in notches 14 formed in the inner edges of the blades, and the eyes receive within them pivotal pins 15 carried by the blades, these pins forming the pivotal points about which the blades turn.

The blades may be adjusted and held in the desired position in a variety of ways without departing from the invention. The drawing shows adjusting screws 16 carried by the sills 3 and 4, which screws are pivoted at their lower ends to the cultivator blades. Each cultivator blade is shown as having extending therefrom a loop or clip 18 which is received in a slot 17 formed in the lower end of the corresponding adjusting screw. Each adjusting screw extends from an arm 19 extending from the sill and is provided with check-nuts 20 thereon which hold it in adjusted position.

The pivotal point of connection between the cultivator blades and the posts 12 is between the outer edges of the blades and the points of connection with the adjusting screws 16, so that any raising or lowering of the adjusting screws will operate to swing the cultivator blades about their pivotal points and thus change the angular position of said blades. These adjusting screws may be raised or lowered by the nuts 20 and when the adjusting screws are elevated the cultivator blades are thrown into the inclined position shown in Fig. 4 or in some other inclined position, while when the adjusting screws are lowered, the cultivator blades are thrown into an approximately horizontal position, as shown in Fig. 3.

When the cultivator blades are set at an inclination, such as shown in Fig. 4, they cut up and stir up the soil to a considerable depth and by setting them at a still greater inclination, they will operate to force the soil laterally and can thus be used for hilling-up purposes.

By adjusting the cultivator blades into the approximately horizontal position as shown in Fig. 3, they will not stir up the soil to any depth but will slice under the top surface of the soil and thus operate to cut any weeds which may be growing. When adjusted in this way the cultivator has the function of a weed cutter.

Sometimes it is desirable to cut the weeds above the ground instead of below the ground, and this can be accomplished with my improvement by merely adjusting the cultivator blades so that the cutting edges thereof tilt upwardly slightly. When thus adjusted they ride over the surface of the ground and will cut the weeds entirely above the ground.

At the front end of the frame I have shown a depending stud or post 30 which carries at its lower end a plowshare or shovel 31 having any suitable or usual shape. 32 designates a clevis or other connection to which the draft apparatus may be attached. 33 designate the usual handles rising from the frame.

The cultivator blades 10, 11 are preferably made detachable from the frame so that they can be readily removed whenever it is desired to sharpen them or to repair or otherwise fix them. One convenient way of making them thus removable is by making the pivotal pins 15 of less length than the notches 14, so that by moving the blades forwardly the pivotal pins may be disengaged from the eyes 13. After this is done the check-nuts 20 may be removed thus permitting the adjusting screw 16 to be withdrawn from the arm 19. I prefer to make the edge 34 of the blades serrated, as shown best in Fig. 1, as an edge of this construction is more effective in breaking up the soil and is also more effective in cutting weeds.

A cultivator embodying my invention is provided with a cultivator blade which extends longitudinally of the frame and the effective height of which can be varied. In one embodiment of my invention this is secured by pivotally mounting the cultivator blades as above described. I may also secure this effect by employing additional blades or "ridgers" as I have termed them, which can be brought into use thereby to further increase the effective height of the cultivator blades These ridgers are designated 98 and are shown as blades mounted on the posts 12 and adapted to slide up and down thereon. Fig. 2 shows these ridgers in dotted lines in their raised position which is their inoperative position. In Fig. 5 I have illustrated the ridgers as lowered into their operative position. When in their operative position they increase materially the effective height of the cultivator blade and act as additional means for hilling-up purposes. One advantage of using these ridgers is that they can be employed in any position of the cultivator blades.

A cultivator embodying my invention is much easier of draft than an ordinary tooth or shovel cultivator because while an ordinary shovel cultivator has five or seven shovels, my cultivator employs but a single shovel at the apex and the blades are arranged so that they slide through the ground with a minimum of resistance of friction. Further because of the triangular shape of the cultivator absolutely complete cultivation of the soil is insured for a width equal to that between the rear ends of the frame.

Having fully described my invention, what I claim as new and desire to secure by Letters Patent is:—

1. In a cultivator, the combination with a cultivator frame, of two divergently-arranged cultivator blades extending longitudinally thereof, each blade being pivoted to the frame to turn about a horizontal axis extending longitudinally of and parallel to said blade.

2. In a cultivator, the combination with a cultivator frame, of two divergently-arranged cultivator blades extending longitudinally thereof, each blade being pivoted to the frame to turn about an axis parallel to said blade, and adjusting means to turn each blade into different angles to the horizontal.

3. In a cultivator, the combination with a frame comprising two side sills, each having a post depending therefrom, of cultivator blades pivoted to said posts, and means to adjust the angular position of said blades.

4. In a cultivator, the combination with a frame, of two divergently-arranged cultivator blades extending longitudinally thereof, and a vertically-adjustable ridger associated with each cultivator blade.

In testimony whereof, I have signed my name to this specification, in the presence of two subscribing witnesses.

WILBUR T. NORTON.

Witnesses:
  J. E. DUNNEGAN,
  O. B. ROHLAND.